US012623303B2

(12) United States Patent
Walmag et al.

(10) Patent No.: US 12,623,303 B2
(45) Date of Patent: May 12, 2026

(54) METHOD FOR MANUFACTURING A WORK ROLL BY LASER CLADDING

(71) Applicant: Centre de Recherches Métallurgiques ASBL, Brussels (BE)

(72) Inventors: Gisèle Walmag, Tilff (BE); Grégory Esser, Limbourg (BE); Mario Sinnaeve, Merdorp (BE)

(73) Assignee: CENTRE DE RECHERCHES MÉTALLURGIQUES ASBL, Brussels (BE)

( * ) Notice: Subject to any disclaimer, the term of this patent is extended or adjusted under 35 U.S.C. 154(b) by 627 days.

(21) Appl. No.: 18/248,691

(22) PCT Filed: Oct. 13, 2021

(86) PCT No.: PCT/EP2021/078329
§ 371 (c)(1),
(2) Date: Apr. 12, 2023

(87) PCT Pub. No.: WO2022/079108
PCT Pub. Date: Apr. 21, 2022

(65) Prior Publication Data
US 2023/0373032 A1      Nov. 23, 2023

(30) Foreign Application Priority Data
Oct. 13, 2020      (EP) .................................... 20201483

(51) Int. Cl.
| | |
|---|---|
| B23K 26/354 | (2014.01) |
| B22F 1/142 | (2022.01) |
| B23K 26/00 | (2014.01) |
| B23K 26/12 | (2014.01) |
| B23K 26/70 | (2014.01) |
| B23K 35/30 | (2006.01) |
| B22F 5/00 | (2006.01) |
| B23K 101/20 | (2006.01) |
| B23K 103/04 | (2006.01) |

(52) U.S. Cl.
CPC ............ B23K 26/354 (2015.10); B22F 1/142 (2022.01); B23K 26/0006 (2013.01); B23K 26/123 (2013.01); B23K 26/70 (2015.10); B23K 35/3053 (2013.01); B22F 2005/002 (2013.01); B23K 2101/20 (2018.08); B23K 2103/04 (2018.08)

(58) Field of Classification Search
CPC ...... B23K 26/354; B23K 26/70; B23K 26/06; B23K 26/123; B23K 26/00; B23K 26/34; B23K 2101/12; B23K 2103/04; B23K 35/02; B23K 35/30; B23K 35/0244; B23K 35/3053; B22F 1/142; B22F 2005/002; C22C 38/02; C22C 38/04; C22C 38/18; C22C 38/22; C22C 38/24; C22C 38/26; C22C 38/28; C22C 38/36; C22C 38/44; C22C 38/46; F16C 13/00; B23B 27/02
See application file for complete search history.

(56) References Cited

U.S. PATENT DOCUMENTS

| | | | |
|---|---|---|---|
| 4,484,959 A | | 11/1984 | Boucher et al. |
| 4,919,885 A | * | 4/1990 | Meyer ..................... C22C 38/28 420/104 |
| 6,632,395 B1 | * | 10/2003 | Machin ................... C22C 38/58 148/327 |
| 8,704,134 B2 | * | 4/2014 | Branagan ............ C22C 33/0292 219/146.1 |
| 2014/0345353 A1 | * | 11/2014 | Oda ....................... C22C 38/001 148/522 |
| 2018/0015561 A1 | * | 1/2018 | Kawabe ............. B23K 35/0266 |

FOREIGN PATENT DOCUMENTS

| | | | | |
|---|---|---|---|---|
| EP | 0070773 A1 | 1/1983 | | |
| EP | 0533929 A1 | 3/1993 | | |
| EP | 3006124 A1 | * 4/2016 | ............. | C22C 38/04 |
| JP | 2020022989 A | 2/2020 | | |

OTHER PUBLICATIONS

Nozaki, et al. "Outer Layer material of Centrifugal Casting Compound Roll for Rolling and Centrifugal Casting Compound Roll for Rolling," JP 2020022989, F3bruary 13, 2020 (Year: 2020).*

* cited by examiner

*Primary Examiner* — Nathaniel E Wiehe
*Assistant Examiner* — Joshua R Beebe
(74) *Attorney, Agent, or Firm* — Leydig, Voit & Mayer, Ltd.

(57) ABSTRACT

A method for manufacturing a hot rolling mill roll by laser cladding a reusable steel axe substrate having a rotational symmetry axis with a metal coating external layer, the metal coating external layer having a work tool steel composition, the method including: rotating the reusable substrate around the rotational symmetry axis; effecting a laser cladding on the rotating substrate by forming a melt pool on a surface of the rotating substrate by a laser beam as a laser-induced melt pool and affixing the coating layer by feeding a powder material into the laser-induced melt pool to form a coated substrate; and submitting the coated substrate to a post-cladding thermal treatment. The composition for the metal coating external layer is 0.5-3.5% C, 2-18% Cr, 0.5-7% Mo, 0.5-8% V, 0.2-7% W, 0-5% Nb, 0-1% Ti, 0.5-2% Mn, 0.2-3% Si, and 0-3% Ni, a remainder being Fe and inevitable impurities.

14 Claims, No Drawings

METHOD FOR MANUFACTURING A WORK ROLL BY LASER CLADDING

CROSS-REFERENCE TO PRIOR APPLICATIONS

This application is a U.S. National Phase application under 35 U.S.C. § 371 of International Application No. PCT/EP2021/078329, filed on Oct. 13, 2021, and claims benefit to European Patent Application No. EP 20201483.3, filed on Oct. 13, 2020. The International Application was published in English on Apr. 21, 2022 as WO/2022/079108 A1 under PCT Article 21(2).

FIELD

The present invention is related to the field of manufacturing work rolls intended for hot mills, and preferably intended for strip rolling mills. The invention is more specifically related to work rolls obtained by the laser-cladding method.

The present application is related to an improvement of patent EP 3 006 124 B1, which is incorporated by reference in the present patent application.

BACKGROUND

In order to meet high productivity and surface quality requirements of their customers, manufacturers of work rolls for rolling mills are led to explore different materials submitted to increasingly harsh specifications. Under normal hot operating conditions, the table of the work roll has to withstand wear and hot thermal fatigue induced by the periodicity of its fast cooling and reheating at each revolution of the roll. Such rolls, that are required to have a very tough and wear-resistant surface while having a ductile core, can be manufactured by various techniques, among which spin or centrifugal casting, which is the conventional method, laser cladding or powder metallurgy by hot isostatic pressing of a shell built up to a steel core.

Laser cladding is a surface-processing technology involving the deposition of a material of different nature on a metal substrate using a laser beam. Cladding consumables are deposited in either wire or powder form transported by an inert gas, injected into the molten pool, either laterally or coaxially to the laser beam, melted and consolidated by use of the laser, in order to coat part of the substrate. It is often used to improve mechanical properties, to provide higher wear resistance, heat resistance or higher hardness or to increase corrosion resistance.

Work rolls for hot strip mills (HSM) are usually manufactured using the spin-casting method followed by a heat treatment. The roll is constituted by a cast or forged iron or steel core with an external shell of highly alloyed steel grade, which composition comprises high carbon, Mn, Si and elements generating carbides, such as W, Mo, V, Cr, Co, etc.

Document EP 0 070 773 A1 relates to a method for laser cladding a HSS powder, i.e. a high speed steel powder, on mill rolls made of mild steel. The HSS powder has a general composition (in mass) of: 0.5-2.6% C, 0.2-1.7% Mn, 0.2-1.4% Si, ≤0.2% S, 2-14% Cr, ≤12% Mo, ≤20% W, V:≤10, ≤16% Co, with the sum of W, V, Mo, Co≥3. Additional usable types of HSS with typical elemental ranges are disclosed in this document, e.g. Cr—W steels, Cr—Mo steels, Cr—W—Mo steels. A typical coating thickness is e.g.

about 15 mm. The cladding is followed by a tempering treatment to precipitate carbides (soften matrix, stress relief).

In addition, documents Scandella F.; "Développement d'un acier rapide pour le revêtement de cylindres de laminage á chaud", *Soudage et Technique Connexes*, Mars-Avril 2010, pp. 35-46, and EP 0 533 929 A1 also refer to the development of high speed steels used as coating materials for mill rolls (hot working rolls) and to composite rolls for use in rolling.

Document EP 3 006 124 B1 discloses a method for manufacturing a rolling mill roll by laser cladding a reusable steel axe substrate having a rotational symmetry axis with a metal coating external layer, said metal coating external layer having a work tool steel composition, comprising the steps of:

rotating the reusable substrate around its axis of rotational symmetry;

effecting a laser cladding on the rotating substrate, by forming a melt pool on the surface of the rotating substrate by means of a laser beam and affixing the coating layer by feeding a powder material into the laser-induced melt pool;

submitting the coated substrate to a thermal treatment made of a tempering treatment comprising a heating up to a temperature in the range 500-650° C. followed by a holding at this temperature during a time comprised between 2 and 5 hours, in order to soften martensite and precipitate carbides;

wherein the composition for said metal coating external layer is consisting of 0.5-3.5% C, 2-18% Cr, 0.5-7% Mo, 0.5-8% V, 0.2-5% W, 0-5% Nb, 0-1% Ti, 0.5-1% Mn, 0.2-3% Si and 0-3% Ni, the rest being Fe and inevitable impurities;

wherein a preheating of the substrate is performed, thanks to a coating head combining induction heating with laser cladding process;

wherein the cladding rate is in the range from 2.35 kg/h to 18 kg/h; and wherein said external coating layer is made of multiple added coated sublayers and has a total thickness comprised between 1 and 30 mm, the thickness of each single external coating sublayer being comprised between 0.1 and 2.5 mm.

The roll coating composition disclosed in EP 3 006 124 B1 is similar to the general alloy composition with elemental ranges of C, Si, Mn, Cr, Mo, Nb and V of Scandella F. (ibidem), and with significant overlapping for the ranges of W and Ti, and to the composition disclosed in several examples of EP 0 533 929 A1.

However the subject-matter of EP 3 006 124 B1 differs from the method known in the three previous documents in that it proposes an induction-assisted laser cladding, i.e. the use of a coating head combining induction heating with laser cladding process, which allows to preheat the substrate, thereby providing a more efficient laser cladding process with higher deposition rate and reduced tempering treatment.

Document Bruckner F. et al., "Innovations in laser cladding and direct metal deposition", *High Power Laser Materials Processing: Lasers, Beam Delivery, Diagnostics, and Applications*, SPIE, 1000 20th St. Bellingham WA, USA (2012) vol. 8239, no 1, pages 1-6, describes induction-assisted laser cladding with high deposition rates up to 18 kg/h on large cylindrical components. However this document does not specifically mention rolling mill rolls, and refers in the case of induction-assisted laser cladding merely to Co-based (Stellite 20) and Ni-based (INCONEL 625) cladding alloys. HSS steels in general, or even the cladding alloy of EP 3 006 124 A1 are not disclosed in this document.

Document US 2014/345353 A1 discloses a centrifugally cast composite roll for hot rolling comprising an outer layer having a composition comprising by mass 0.8-3.5% of C, 0.1-2.5% of Si, 0.1-2.5% of Mn, 1.2-15% of Cr, 1-5% of Ni, and 1-10% of Mo+0.5×W, the balance being substantially Fe and inevitable impurities, and an inner layer made of an iron-based alloy and integrally fused to the outer layer; the outer layer having Shore hardness of 67-82 at the initial diameter of the composite roll; and the maximum Shore hardness of the outer layer in a range 30 mm or more deep from the initial diameter being higher by 1 or more than the Shore hardness of the outer layer at the initial diameter.

In document JP2020022989A it is intended to provide an outer layer material of a centrifugal casting compound roll for rolling which is excellent in wear resistance and surface roughening resistance and to provide a centrifugal casting compound roll for rolling made by melt-sticking and integrating an outer layer composed of the outer layer material and an inner layer. Therefor it is provided an outer layer material of a centrifugal casting compound roll for rolling comprising an Fe alloy, by mass, consisting of 1.50 to 2.70% C, 0.3 to 3% Si, 0.1 to 3% Mn, 0.1 to 2.5% Ni, 4.0 to 7.0% Cr, 4.1 to 8.0% Mo, 5.0 to 10.0% V, 0 to 0.4% W, 0.1 to 3.0% Nb, 0.005 to 0.15% N, 0 to 0.05% B and the balance substantially consisting of Fe and inevitable impurities, and that is characterized in that the ratio of V content (mass %) to Nb content (mass %) is 1 to 20.0 and a C-bal exhibited by the following relation is 0 to 0.28: C-bal=C %-0.2×V %-0.06×Cr %-0.063×Mo %-0.033×W %-0.13×Nb %.

SUMMARY

In an embodiment, the present invention provides a method for manufacturing a hot rolling mill roll by laser cladding a reusable steel axe substrate having a rotational symmetry axis with a metal coating external layer, the metal coating external layer having a work tool steel composition, the method comprising: rotating the reusable substrate around the rotational symmetry axis; effecting a laser cladding on the rotating substrate by forming a melt pool on a surface of the rotating substrate by a laser beam as a laser-induced melt pool and affixing the coating layer by feeding a powder material into the laser-induced melt pool to form a coated substrate; and submitting the coated substrate to a post-cladding thermal treatment, wherein the composition for the metal coating external layer comprises 0.5-3.5% C, 2-18% Cr, 0.5-7% Mo, 0.5-8% V, 0.2-7% W, 0-5% Nb, 0-1% Ti, 0.5-2% Mn, 0.2-3% Si, and 0-3% Ni, a remainder being Fe and inevitable impurities, wherein a preheating of the substrate is performed due to a coating head combining induction heating with a laser cladding process, wherein a cladding rate is in a range from 2.35 kg/h to 18 kg/h, and wherein the external coating layer comprises multiple added coated sublayers and has a total thickness between 1 and 30 mm, a thickness of each single external coating sublayer being between 0.1 and 2.5 mm, wherein the method further comprises: selecting a composition for the metal coating external layer that comprises nitrogen in a range 200-2500 ppm, so as to increase abrasion resistance and in which a sum of atomic contents (mass %) of MC carbides forming elements, selected from a group consisting of Ti, Nb, and V, +3/8 of a sum of atomic contents (mass %) of $M_{23}C_6$ and/or $M_2C$ forming elements, selected from a group consisting of Mo, W, and Cr, is lower than a sum of atomic contents (mass %) of interstitial elements C and N, +0.01, so as to achieve homogeneous hardness for a multi-layer coating; and drying or heating the powder used for cladding, controlling strictly ambient humidity, and performing the cladding process under a controlled protecting atmosphere so as to obtain a final hydrogen content in the metal coating external layer lower than 1 ppm, permitting suppression of cracks.

DETAILED DESCRIPTION

In an embodiment, the present invention provides work rolls intended for hot rolling mills, having a coating made of clad-layers with very high soundness (in terms of cracks, porosities and oxidation).

In an embodiment, the present invention provides a method for manufacturing a rolling mill roll, where the cladding rate and the coating quality (i.e. in terms of microstructure and crack size) are improved at the same time.

In an embodiment, the present invention provides a long duration cladding method for work rolls as well as improved mechanical properties of the laser-clad layers (e.g. resistance to thermal fatigue, and to surface degradation.

In an embodiment, the present invention provides a method for manufacturing a hot rolling mill roll by laser cladding of a reusable steel axe substrate having a rotational symmetry axis with a metal coating external layer, said metal coating external layer having a work tool steel composition, comprising the steps of:

rotating the reusable substrate around its axis of rotational symmetry;

effecting a laser cladding on the rotating substrate, by forming a melt pool on the surface of the rotating substrate by means of a laser beam and affixing the coating layer by feeding a powder material into the laser-induced melt pool;

submitting the coated substrate to a post-cladding thermal treatment;

wherein the composition for said metal coating external layer comprises 0.5-3.5% C, 2-18% Cr, 0.5-7% Mo, 0.5-8% V, 0.2-7% W, 0-5% Nb, 0-1% Ti, 0.5-2% Mn, 0.2-3% Si and 0-3% Ni, the rest being Fe and inevitable impurities;

wherein a preheating of the substrate is performed, thanks to a coating head combining induction heating with laser cladding process;

wherein the cladding rate is in the range from 2.35 kg/h to 18 kg/h; and wherein said external coating layer is made of multiple added coated sublayers and has a total thickness comprised between 1 and 30 mm, the thickness of each single external coating sublayer being comprised between 0.1 and 2.5 mm, characterised in that it further comprises:

selecting a composition for said metal coating external layer that further comprises nitrogen in the range 200-2500 ppm, so as to increase abrasion resistance and in which the sum of atomic contents (mass %) of MC carbides-forming elements, selected from the group consisting of Ti, Nb, and V, +3/8 of the sum of atomic contents (mass %) of $M_{23}C_6$ and/or $M_2C$ forming elements, selected from the group consisting of Mo, W, and Cr, is lower than the sum of atomic contents (mass %) of interstitial elements C and N, +0.01, so as to achieve homogeneous hardness in case of a multi-layer coating;

drying or heating the powder used for cladding, controlling strictly ambient humidity and performing cladding process under a controlled protecting atmosphere, so as to obtain a final hydrogen content in the metal coating external layer lower then 1 ppm, permitting to suppress cracks.

According to preferred embodiments of the invention, the method is further limited by one or a suitable combination of the following features:

the composition for said metal coating external layer comprises nitrogen in the range 200-400 ppm;

the ambient dew point during cladding is between −5° C. and +15° C.;

the controlled protective atmosphere is composed of $N_2$ or Ar;

the laser power is set in the range from 10 to 80 W/mm²;

the method comprises a preliminary step of preparing the reusable substrate by cleaning and/or machining the surface of the reusable substrate;

the surface roughness of the substrate before cladding is comprised between 1 and 8 μm;

a surface degreasing is applied before cladding to obtain less than 1 mg/m² of surface organic carbon to reduce production of fumes during high temperature cladding and further to reduce oxidation of the coating;

the composition for said metal coating external layer further comprises nitrogen in the range 200-1500 ppm;

the preheating of the substrate is performed in the range 20° C.-500° C., and preferably in the range 200° C.-300° C.;

the post-cladding thermal treatment is a controlled cooling, or a tempering treatment comprising a heating up to a temperature in the range 500-650° C. followed by a holding at this temperature during a time comprised between 2 and 5 hours, in order to soften martensite and precipitate carbides;

the composition of the steel axe comprises 0.2-0.5% C and 0.5-5% Cr, 0-1% Mo, 0-1% Mn and 0-0.4% Si, the rest being Fe and the inevitable impurities;

the composition of the steel axe comprises 0.4% C and 1-2% Cr.

The present invention relates to an improved laser-cladding method for coating a roll having a steel axe (or shaft or spindle) substrate with a deposition of a "layer" of hot or cold work tool steel, which can be obtained from successive sublayers. Tool steels used are similar to HSS work roll grades and/or with higher carbide content.

The inventors extensively studied various options to permit full industrial commissioning and improvement of the rolling mill rolls laser-cladding manufacturing method described in EP 3 006 124 B1.

A number of parameters are influencing the soundness of laser-clad layers, characterised by reduced (or no) cracks, porosities and oxidation. The porosity should be lower than the one of products obtained by spin casting as measured by the DGS (Distance Gain Size) method as described in ISO 16811:2012(en) (Non-destructive testing—Ultrasonic testing—Sensitivity and range setting) and ISO 5577:2017(en) (Non-destructive testing—Ultrasonic testing—Vocabulary).

At the interface between the laser-clad layer and the substrate, no defect larger than DGS(AVG) 4 mm is accepted. In the laser-clad layer, no defect larger than DGS (AVG) 0.5 mm is accepted with a maximum of 5 indications <4 mm on a surface of 10 cm×10 cm.

According to some embodiments of the present invention: hydrogen content of the laser clad-layers is below 1 ppm;

hydrogen content of the powder used for cladding is below 1 ppm, thanks to powder preliminary drying or heating;

the ambient dew point during cladding is between −5 and +15° C.;

the cooling or post-heating after cladding is controlled;

the substrate is preheated;

the laser power is in the range from 10 to 80 W/mm².

In particular, the hydrogen content should be as low as possible all along the process. In this application of difficult-to-weld steels, hydrogen could cause weakening at grain boundaries and thus cracks, which is to be avoided in the present invention.

Hydrogen could be present in water traces or in ambience and cladding powder humidity. Thus, according to the invention, cladding power is dried or heated, and the ambient humidity strictly controlled, the cladding process being further performed under a controlled protected atmosphere, preferably composed of $N_2$ or Ar.

Further, some parameters should have values which have positive effect on a cladding of long duration. According to some embodiments of the invention:

the surface roughness of the substrate is comprised between 0.2 and 8 μm;

a surface degreasing is applied before cladding to obtain less than 1 mg/m2 of surface organic carbon. Suitable degreasing is very important as the production of fumes during high temperature cladding would lead to harmful oxidation of the coating.

Finally, a number of parameters are more particularly influencing the mechanical properties of the laser-clad layers. An essential feature of the present invention is that the composition of the coating clad-layers should comply with a special relationship depending of the ratio carbon (or more generally interstitial elements)/carbide generating elements.

According to some embodiments of the invention:

in order to achieve homogeneous hardness on multilayer coating, a specific relationship (i.e. inequation) between interstitial elements and carbides forming elements needs to be fulfilled. According to the invention, the atomic content (mass %) of MC carbides-forming elements (such as Ti, Nb, V, Ta, etc.)+3/8 of the atomic content (mass %) of $M_{23}C_6$ and/or $M_2C$ forming elements (such as Mo, W, Cr, etc.) should be lower than the atomic content (%) of the interstitial elements (such as C, N, B, etc.)+0.01;

Mn content is between 0 and 2% and W content is between 0.2 and 7%;

increased abrasion resistance is provided by addition of nitrogen in the range 200-2500 ppm, and preferably in the range 200-400 ppm.

The above relationship between the carbide-forming elements and the interstitial elements is illustrated in Table 1 for a series of eleven coating alloys obtained by way of the present invention. For each case the hardness homogeneity was checked and compared to the fulfilment or not of the inequation. Hardness was considered homogeneous if the deviation is lower than 50 HV (EN ISO 6507-1 to 6507-4).

TABLE 1

| | (Ti + Nb + V) + ⅜(Mo + W + Cr)(atomic %) | | (C + N)(atomic %) + 0.01 | hardness homogeneity |
|---|---|---|---|---|
| alloy 1 | 0.0954 | > | 0.0939 | not ok |
| alloy 2 | 0.0954 | < | 0.0957 | ok |

TABLE 1-continued

| | (Ti + Nb + V) + ³⁄₈(Mo + W + Cr)(atomic %) | | (C + N)(atomic %) + 0.01 | hardness homogeneity |
|---|---|---|---|---|
| alloy 3 | 0.1193 | > | 0.1189 | not ok |
| alloy 4 | 0.1193 | < | 0.1207 | ok |
| alloy 5 | 0.1334 | > | 0.1139 | not ok |
| alloy 6 | 0.1334 | > | 0.1157 | not ok |
| alloy 7 | 0.1391 | > | 0.1165 | not ok |
| alloy 8 | 0.1396 | < | 0.1506 | ok |
| alloy 9 | 0.1396 | < | 0.1524 | ok |
| alloy 10 | 0.1432 | < | 0.1589 | ok |
| alloy 11 | 0.1432 | < | 0.1607 | ok |

The characteristics of the laser-cladding method used in the present invention are the following:

high metallurgical bonding;

low or no porosity and benefit of a high cooling rate leading to very fine microstructure;

homogeneous composition;

coating thickness: 0.1-2 mm per (sub)layer;

thicker coatings obtained by adding multiple layers, the thickness of the total external layer being comprised between 1 and 30 mm, and preferably about 20 mm;

cladding rate from 2.35 kg/h to 18 kg/h with special heads (combination of induction heating with laser-cladding process);

pre-heating of substrate when necessary;

post-thermal treatment (e.g. tempering).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for manufacturing a hot rolling mill roll by laser cladding a reusable steel axe substrate having a rotational symmetry axis with a metal coating external layer, the metal coating external layer having a work tool steel composition, the method comprising:

rotating the reusable substrate around the rotational symmetry axis;

effecting a laser cladding on the rotating substrate, by forming a melt pool on a surface of the rotating substrate by a laser beam as a laser-induced melt pool and affixing the coating layer by feeding a powder material into the laser-induced melt pool to form a coated substrate; and submitting the coated substrate to a post-cladding thermal treatment, wherein the composition for the metal coating external layer comprises 0.5-3.5% C, 2-18% Cr, 0.5-7% Mo, 0.5-8% V, 0.2-7% W, 0-5% Nb, 0-1% Ti, 0.5-2% Mn, 0.2-3% Si, and 0-3% Ni, a remainder being Fe and inevitable impurities, wherein a preheating of the substrate is performed due to a coating head combining induction heating with a laser cladding process, wherein a cladding rate is in a range from 2.35 kg/h to 18 kg/h, and wherein the external coating layer comprises multiple added coated sublayers and has a total thickness between 1 and 30 mm, a thickness of each single external coating sublayer being between 0.1 and 2.5 mm, wherein the method further comprises:

selecting a composition for the metal coating external layer that comprises nitrogen in a range 200-2500 ppm, so as to increase abrasion resistance and in which a sum of atomic contents (mass %) of MC carbides forming elements, selected from a group consisting of Ti, Nb, and V, +3/8 of a sum of atomic contents (mass %) of $M_{23}C_6$ and/or $M_2C$ forming elements, selected from a group consisting of Mo, W, and Cr, is lower than a sum of atomic contents (mass %) of interstitial elements C and N, +0.01, so as to achieve homogeneous hardness for a multilayer coating; and drying or heating the powder used for cladding, controlling strictly ambient humidity, and performing the cladding process under a controlled protecting atmosphere so as to obtain a final hydrogen content in the metal coating external layer lower than 1 ppm, permitting suppression of cracks.

2. The method of claim 1, wherein the selected composition for the metal coating external layer comprises nitrogen in a range of 200-400 ppm.

3. The method of claim 1, wherein an ambient dew point during cladding is between −5° C. and +15° C.

4. The method of claim 1, wherein the controlled protective atmosphere comprises $N_2$ or Ar.

5. The method of claim 1, wherein a laser power is set in a range from 10 to 80 $W/mm^2$.

6. The method of claim 1, further comprising:

preliminarily preparing the reusable substrate by cleaning and/or machining a surface of the reusable substrate.

7. The method of claim 6, wherein a surface roughness of the substrate before cladding is between 1 and 8 μm.

8. The method of claim 6, wherein a surface degreasing is applied before cladding to obtain less than 1 mg/m² of surface organic carbon to reduce production of fumes during high temperature cladding and to reduce oxidation of the coating.

9. The method of claim 1, wherein the composition for the metal coating external layer comprises nitrogen in a range 200-1500 ppm.

10. The method of claim 1, wherein the preheating of the substrate is performed in a range of 20° C.-500° C.

11. The method of claim 10, wherein the preheating of the substrate is performed in the range of 200° C.-300° C.

12. The method of claim 1, wherein the post-cladding thermal treatment comprises a controlled cooling, or a tempering treatment comprising a heating up to a temperature in a range 500-650° C. followed by a holding at such temperature for between 2 and 5 hours, in order to soften martensite and precipitate carbides.

13. The method of claim 1, wherein the composition of the steel axe comprises 0.2-0.5% C and 0.5-5% Cr, 0-1% Mo, 0-1% Mn and 0-0.4% Si, a remainder being Fe and the inevitable impurities.

14. The method of claim 13, wherein the composition of the steel axe comprises 0.4% C and 1-2% Cr.

\* \* \* \* \*